United States Patent

Eloranta

[15] 3,641,889
[45] Feb. 15, 1972

[54] EXPOSURE CONTROL SYSTEM
[72] Inventor: Viato K. Eloranta, Needham, Mass.
[73] Assignee: Polaroid Corporation, Cambridge, Mass.
[22] Filed: Sept. 2, 1970
[21] Appl. No.: 68,919

[52] U.S. Cl. ..........................................95/10 CE, 95/64 B
[51] Int. Cl. ....................G03b 9/07, G03b 9/14, G03b 9/08
[58] Field of Search ...................95/53 E, 53 EA, 53 ER, 63, 95/64 R, 64 B, 10 CE

[56] References Cited

UNITED STATES PATENTS

| 3,393,621 | 7/1968 | Kitanosono et al. | 95/11.5 R |
| 3,470,808 | 10/1969 | Bloemendaal et al. | 95/59 |
| 3,299,789 | 1/1967 | Chandler et al. | 95/64 R |
| 3,051,065 | 8/1962 | Kobayashi | 95/11.5 X |

FOREIGN PATENTS OR APPLICATIONS

3,710,285  8/1962  Japan ......................................95/64 B

Primary Examiner—Samuel S. Matthews
Assistant Examiner—Russell E. Adams, Jr.
Attorney—Brown and Mikulka, William D. Roberson and Gerald L. Smith

[57] ABSTRACT

An exposure control system for a single-lens reflex camera. The system incorporates a shutter having a normally open status for camera viewing and focusing. An exposure cycle is commenced upon energization of a solenoid which drives a shutter to a closed position. This solenoid is deenergized to commence an exposure interval and reenergized to terminate the interval of exposure. During the latter energization, the camera is converted from an exposure operational mode to a viewing and focusing mode.

37 Claims, 5 Drawing Figures

EXPOSURE CONTROL SYSTEM

BACKGROUND OF THE INVENTION

Automatic exposure control systems for photographic devices function to evaluate scene brightness for levels of illumination, weight this evaluation with respect to the sensitometric characteristics of a film being exposed and regulate one or more variable exposure control parameters such as exposure interval or aperture size in correspondence with the weighted evaluation. Scene brightness evaluation for the systems is performed with light-measuring circuits utilizing one or more photosensitive elements. The elements are aligned to be responsive to the light characteristics of a scene somewhat coincident with the field of view of an objective or taking lens system.

Certain control systems provide for automatic control over both aperture selection and shutter speed. This dual exposure parameter regulation preferably is carried out under a predetermined program which seeks to optimize parameter selection for the most often encountered photographic situations. For instance, in a typical photographic situation, aperture is selected at such higher f/stop values as may be practically available, while corresponding shutter speed is selected as fast as possible in view of lighting conditions and the desired aperture setting. Generally, the exposure programs comprise or draw a balance between achieving large depth of field with small relative apertures but longer exposure times and stopping subjects in motion with short exposure times, but larger relative apertures.

In achieving automated exposure control under a predetermined exposure program, it is desirable that the exposure mechanism called upon to regulate scene light be of relatively noncomplex design so as to permit its fabrication at reasonable cost. One less complex but programmable automatic exposure control system provides for a progressive variation of relative aperture from a minimum value toward a maximum value commencing with the initiation of an exposure interval. When sufficient light has been permitted to pass through the continually varying aperture, light passage is blocked and exposure terminated either by a separate shutter blade or by causing the aperture defining blades of the mechanism to rapidly reverse their movement.

Such automated and programmed exposure control systems additionally may be called upon to function within camera logic systems requiring operations beyond those occurring during an interval of film exposure. These additional operations are difficult to incorporate with conventionally automated exposure control systems. For instance, should the exposure mechanisms be called upon to perform within reflex cameras of a single-lens variety, they must assume an open status providing maximum aperture diameter size during the steps or operational mode of viewing and focusing. Following a viewfinding and focusing procedure, the exposure control system must automatically close to permit the camera to adjust from a focusing and viewfinding mode to an exposure mode without jeopardizing the lighttight integrity of its exposure chamber. This procedure usually involves the movement of an operator member carrying a reflective surface and a consequent realignment of an optical path to permit scene light to reach the exposure plane of the camera. Following the delay occasioned by this operational mode adjustment, the exposure control system is called upon to automatically commence an exposure interval to automatically expose film at the exposure plane under a predetermined exposure program. At the termination of an exposure interval, the exposure control system blocks the passage of scene light to the exposure plane and must remain in the blocking position until the optical path components of the camera mechanism reassume a focusing mode. As this latter mode is reassumed, the exposure system is again called upon to provide an aperture opening of maximum diameter.

While being required to perform all of the above-delineated operations in the course of an exposure cycle, the automated exposure control system should incorporate all requisite mechanical features permitting both its efficient performance as well as assuring its reliable operation over long periods of ownership. Such features call for designs wherein spring members are not held under tension during periods of nonusage and for relatively simple mechanical interrelationships between the moving parts of the mechanism. Further, the exposure system should be capable of operation under moderate spring force leads.

SUMMARY OF THE INVENTION

The present invention is addressed to an automatic exposure control system and related photographic camera which provides a desirable dual exposure parameter control while, additionally, contributing the functions necessary to the operation of cameras of the single-lens reflex variety. Dual-parameter exposure control is provided under an exposure program in which aperture size is progressively varied in correspondence with exposure time commencing at the initiation of an exposure interval. The shutter mechanism of the exposure control system accommodates a requisite viewing and focusing mode for a single-lens reflex camera by having a normally open status which unblocks the passage of light through the exposure aperture and to a focusing plane or the like within the camera. Ideally, this normally open status of the shutter mechanism is provided at maximum aperture diameter to facilitate viewing.

At the commencement of an exposure cycle, the shutter arrangement of the exposure control mechanism is electrically driven into a closed or light-blocking orientation. When in this light-blocking orientation, the photographic camera in which the shutter is incorporated may be automatically operated to change from the viewing and focusing mode orientation requiring a fully opened shutter to an exposure mode. In such an exposure mode, photosensitive film at an exposure plane is uncovered or made assessible to the optical path of the taking lens of the camera. When the camera has assumed this exposure mode of operation, the exposure control system operates to release the shutter from its light-blocking orientation to be drawn by nonelectrical means from an orientation defining a minimum exposure aperture toward a fully open or maximum aperture position. The time required for shutter opening is predetermined in accordance with the above-noted exposure control program. At the termination of an electronically determined exposure interval, the shutter is again driven to a fully closed or light-blocking position to terminate exposure. This light-blocking orientation of the shutter is electrically sustained until such time as the camera within which it is incorporated reassumes an initial viewing or focusing mode wherein the exposure plane is again covered. At such time, the electrical holding system is released to permit the shutter to again resume its fully open position under the bias exerted by the nonelectrical arrangement used during an exposure interval.

In a preferred embodiment of the invention, the arrangement for driving the shutter assembly is provided by an electromagnet device such as a solenoid. At the commencement of an exposure cycle, the electromagnetic drive is energized to cause the shutter to close or assume its blocking position. The solenoid is continually energized to hold the shutter in its closed position until the reflex camera within which it is incorporated is permitted to mechanically alter to its exposure mode status. At such time, the solenoid is deenergized to release the shutter for its opening movement and to commence automatic exposure control. As the shutter commences to open, it defines a progressively enlarging aperture diameter while exposure interval time progresses. When the automatic control system determines that exposure should be terminated, the solenoid is again energized to rapidly cause the shutter to close and terminate exposure. This energization is sustained to retain the shutter in a light-blocking position until the reflex camera reassumes its initial viewing or focusing mode. As this mode is reached and the exposure plane is covered, the electrical control system is deenergized to a standby status, thereby deenergizing the solenoid and permitting the shutter to open to its fullest extent of viewing. To provide opening movement for the shutter, a simple spring-biasing arrangement is utilized.

As another feature and object, the system of the invention is suited for use with an ideally simple exposure mechanism incorporating a pair of shutter blades which are coupled for corresponding and simultaneous oppositely directed movement. Each blade is formed having a selectively designed aperture opening. These openings are arranged to conjointly move between terminal positions about the axis of the optical path of the camera to define progressively increasing aperture sizes. The shutter blades may also incorporate correspondingly similar openings which attenuate scene light permitted to impinge upon the sensing element of a light-sensitive circuit. A simple spring member is utilized to bias the blades into their fully open position and a solenoid is energizable to drive the blades into a light-blocking position. An actuator element in the form of a "walking beam" may be used to mechanically couple the shutter blades. This same walking beam may be used additionally to provide connection of the shutter assembly with a driving solenoid as well as a spring member which, as noted above, functions to bias the shutter for movement into a fully open orientation.

The ideal simplicity of the shutter mechanism and its related control technique will become apparent in the description to follow. For instance, only two shutter blade components are required in addition to a simple pivoting beam coupling. This coupling also provides for union of the shutter blades with a singular solenoid and a singular shutter-opening spring. Because the shutter is caused to open over a predetermined interval, the force values required of its opening spring are ideally minimal, thereby imposing no undue load requirements upon the solenoid drive system.

The invention accordingly comprises a system and apparatus possessing the features, technique and properties which are exemplified in the description to follow hereinafter, and the scope of the invention is indicated within the appended claims.

DETAILED DESCRIPTION

Figure 1:
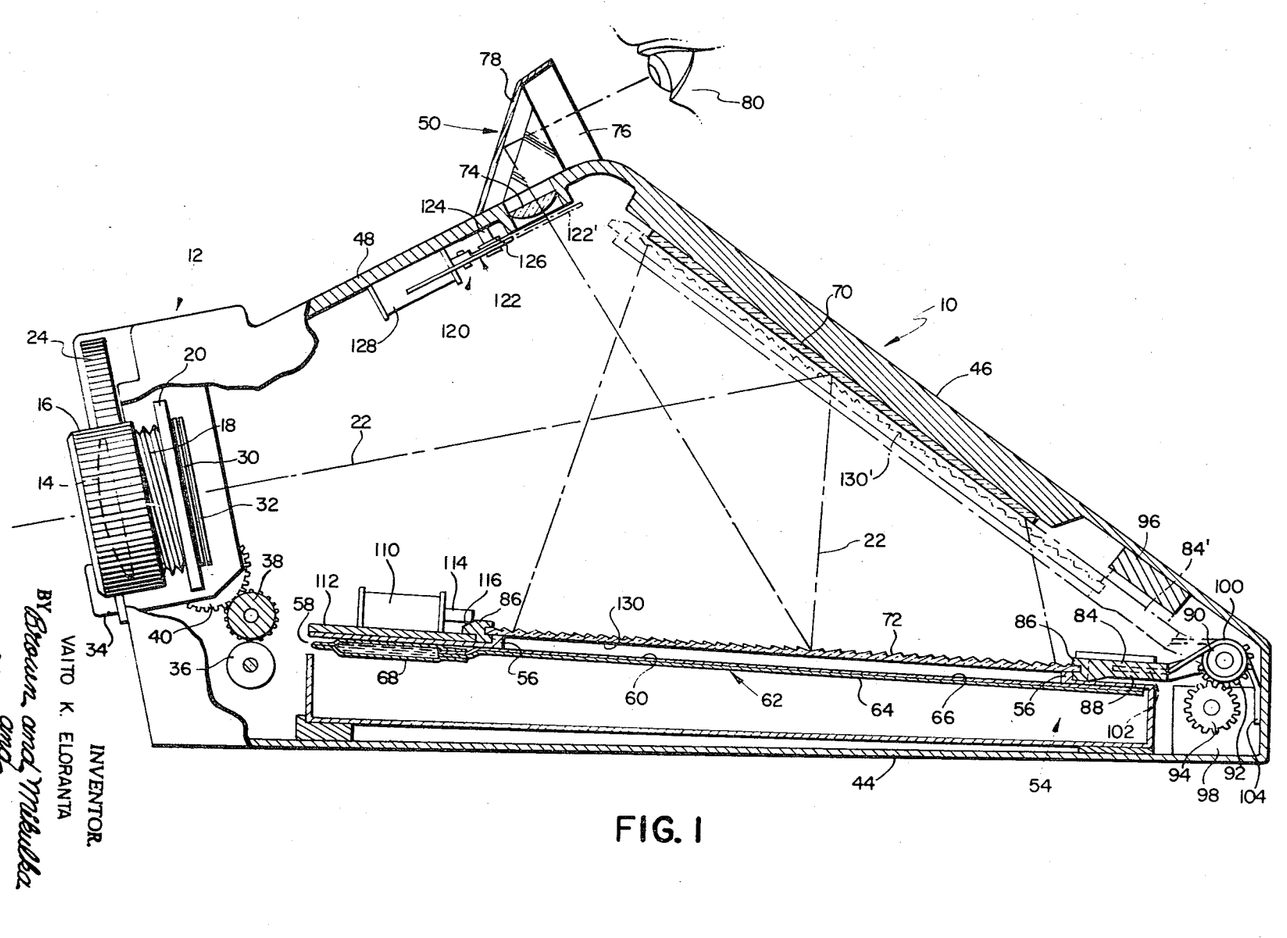
FIG. 1 is a side view of a single-lens reflex camera incorporating the exposure control system of the invention and having portions broken away to reveal internal structure.

Referring to FIG. 1, a photographic camera is illustrated generally at 10. Configured for single-lens reflex operation, camera 10 operates in two modes, a focusing and viewing mode in which the image of a scene to be photographed is arranged and viewed by the operator at a viewing plane, and an exposure mode wherein the predetermined scene image is presented at an exposure plane for recordation upon a photosensitive material or film.

Figure 2:
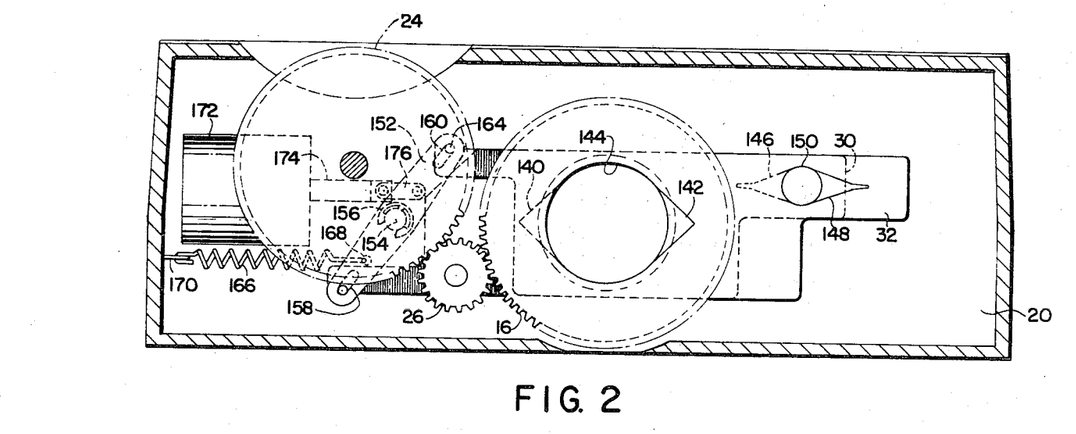
FIG. 2 is a front view of the exposure mechanism of the camera of FIG. 1 with portions broken away and shown in phantom to reveal the interrelationship of its components.
Figure 3:
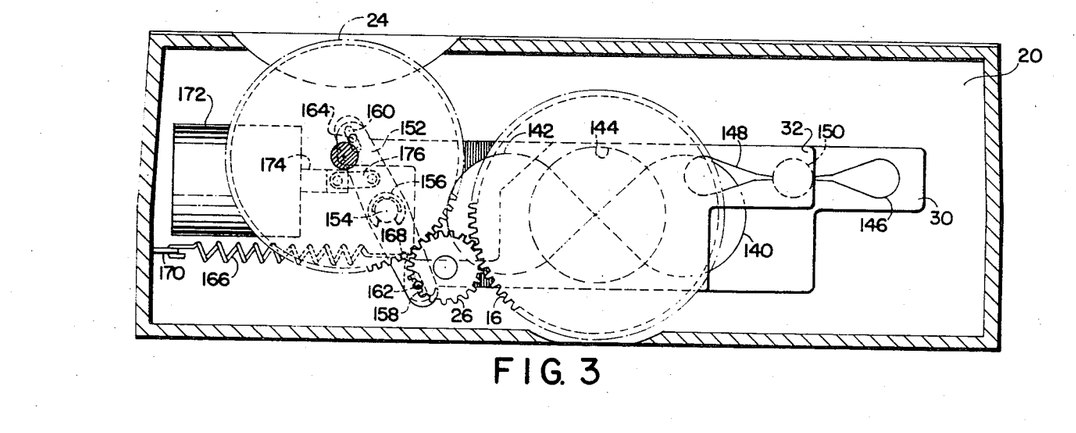
FIG. 3 is the front view of the exposure mechanism as shown in FIG. 2, the components thereof being illustrated in a closed or light-blocking orientation.

Camera 10 is formed having a forwardly disposed exposure control mechanism housing 12 within which are mounted the basic elements required to regulate an exposure. The components within housing 12 include an objective or taking lens 14, a certain element of which are mounted within a rotatable bezel 16. Bezel 16 is internally threaded and rotatably mounted over an externally threaded cylindrical lens mount 18 fixed, in turn, to a baseplate 20. Bezel 16 is rotatable to provide translational movement of elements of lens 14 along the axis 22 of the optical path of the camera. This rotation is carried out by manual rotation of an externally threaded focusing knob 24. Focusing knob 24 is interconnected in driving relationship with the externally exposed teeth of bezel 16 through an idler gear 26 (FIGS. 2 and 3). Immediately behind the lens 14 and camera aperture, the baseplate 20 supports two shutter blade elements 30 and 32 which are described in detail later herein. Extending forwardly from one side of housing 12 is a shutter release button 34, the depression of which causes the commencement of an exposure cycle.

Additionally mounted within an exposure control mechanism housing 12 is a control circuit (not shown) as well as film unit processing rolls 36 and 38 and their associated drive mechanism, one gear component of which is shown at 40.

Camera 10 is formed having a bottom support portion 44, a relatively elongated top wall section 46 which will be seen to support reflecting surfaces of a reflex optical system, and a shorter forward wall portion 48. Wall portion 48 serves to support a viewing arrangement shown generally at 50.

Bottom support portion 44 serves as a receiving and retaining chamber for a film-laden cassette structure as illustrated generally at 54. Cassette 54 is formed as a generally thin parallelopiped having a top open portion, the rectangular periphery of which is defined by an integrally formed ridge 56. The forwardmost facing side of cassette 54 is formed incorporating an opening or slot 58 aligned with the line of tangency between rolls 36 and 38. Cassette 54 is removably insertable within the cassette-receiving chamber of bottom support portion 44 so as to consistently and accurately orient within camera 10 an exposure plane 60 established at the lowermost periphery of the film frame opening defined by ridge 56. A detailed disclosure of the mechanisms for supporting cassettes as at 26 within the camera 10 are disclosed in a copending application for U.S. Patent entitled "Folding Camera" by E. H. Land and A. H. Bellows, Ser. No. 655,850, filed July 25, 1967, and assigned in common herewith.

Coincidently situated at the exposure plane 60 is an uppermost one of a plurality of film units 62. Described in detail in U.S. Patent to E. H. Land, No. 3,415,646, entitled "Novel Photographic Products and Processes," film units as at 62 include all the materials necessary to produce a positive photographic print. Each unit 62 is physically structured to include a photosensitive element 64 positioned adjacent and in laminar relationship with an image-receiving element 66. Image-receiving element 66 is located upwardly from element 64 and is urged by spring means (not shown) into exposure plane 60. A rupturable container 68 of processing fluid is secured to one end of the laminar assembly of elements 64 and 66 and is located forwardly within cassette structure 54. Containers 68 dispense their processing fluid between elements 64 and 66 when subjected to appropriate compressive pressure. Each film unit as at 62 is adapted to be processed when advanced, rupturable container 68 foremost, through slot 58 and between pressure-applying processing rolls 36 and 38. The latter manipulation causes container 68 to dispense its fluid contents between elements 64 and 66 and to spread the fluid between and in contact with these two elements. The image-forming process is now well known in the art and involves the formation of transverse image-forming substances in the exposed photosensitive element 64 accompanied by their diffusion in a manner forming a visible, positive image.

The components of camera 10 normally assume a configuration for operation in a focusing or viewing mode. During an exposure cycle, however, the components reorient to assume an exposure mode configuration. FIG. 1 of the drawings is arranged such that the components of the camera 10 are illustrated in solid-line fashion in a focusing mode orientation, while their alternate orientation for an exposure mode are shown in dotted-line fashion. In the focusing mode configuration, the aperture of the lens system 14 is unblocked by virtue of a normally open orientation at shutter blades 30 and 32 such that scene light may be directed along the optical path of the camera, an axis of which is shown at 22. This optical path 22 passes from the lens system 14 and across the exposure chamber of the camera until it impinges upon and is reflected from a specular reflecting surface shown as a mirror 70. Mirror 70 is stationary and fixed to elongated top wall section 46. Upon reflection from mirror 70, the optical path courses to a viewing surface 72. Viewing surface 72 is reflective in nature and may be formed as an echelon or Fresnel Mirror with its incremental sections angularly oriented to redirect the image formed by the rays reflecting from mirror 70 toward the eyepiece lens 74 of viewing arrangement 50. From lens 74, the light reflecting from surface 72 passes through an Amici element or roof prism 76 mounted within an eyepiece housing 78. Housing 78 is attached to forward wall section 48 at a position suitable for viewing from a station as at 80. The presence of this roof prism 78 provides a right-left reversal correction for facilitating operator viewing from station 80.

When in a viewing or focusing mode, the camera 10 is focused by adjusting the taking lens from knob 24 while viewing the image projected to viewing surface 72 from viewing arrangement 50. While the viewing surface 72 serves the optical purpose or redirecting the image from mirror 70 toward the viewing arrangement 50, the structure supporting it serves the additional function of blocking light from reaching the exposure plane 60. Looking to this structure, viewing surface 72 is shown to be mounted upon or formed as an integral component of an operator unit shown generally at 84. Formed of a material opaque to light, unit 84 is of a generally flat configuration and includes a peripherally disposed rib portion or frame, the cross section of which is shown at 86. Frame 86 is rectangular in shape and dimensioned to nest over the rib 56 of film cassette 54. As a consequence of this configuration, the operator unit 84 serves to light-seal or cap the exposure plane 60 at which a film unit 62 is positioned. Peripheral frame 86 is formed integrally with a supporting hinge arrangement, a portion of which is shown at 88. Hinge arrangement 88 is fixed to an axle 90 which, in turn, is journaled for rotation within the housing of camera 10. A spur gear 92 is fixed to the axle 90 and is arranged thereon to be driven from a gear train including a drive gear 94. Immediately above axle 90 is a switch housing 96, the function of which is described later herein. Rotational force is imparted to the gear train including gears 92 and 94 from a battery-powered electric motor shown generally at 98. Operator unit 84 is biased for upward pivotal movement about axle 90 by a spring 100. Spring 100 is slideably wound about axle 90 and has a movable end 102 embedded within hinge portion 88 and a stationary end 104 fixed to the inward side of top wall portion 46.

Operator unit 84 is retained in the focusing mode orientation against the bias of spring 100 by a solenoid latch 110. Latch 110 is fixed upon an internal structural component of the camera 10 housing as partially shown at 112 and is designed having a plunger element 114 which is biased outwardly when the solenoid 110 is in an unenergized state. When in its extended position, plunger 114 engages a latching tip 116 formed within the periphery of frame 86 to retain the operator unit 84 in its downward orientation.

Disposed upon the inward surface of forward wall portion 48 is a single-bladed shutter assembly 120. Assembly 120 includes a shutter blade 122 pivotally mounted upon a post 124 and biased by a helical spring 126 into a position unblocking the passage of light into viewing arrangement 50. Blade 122 is also coupled with the plunger of a solenoid 128. When energized, solenoid 128 drives the blade 122 into a position blocking the passage of light through viewing arrangement 50.

When camera 10 is operating in its exposure mode, solenoid 128 is energized and shutter blade 122 of assembly 120 is moved into the light-blocking orientation as shown in phantom at 122'. Additionally, operator unit 84 is released from latching engagement with plunger 114 of solenoid latch 110. When so released, the unit 84 moves under the bias of spring 100 to a position abutting elongated top wall section 46 as shown in phantom at 84'. Operator unit 84 is configured having a specularly reflecting surface 130 formed on its inner face opposite surface 72. When moved into the exposure mode orientation shown at 84', specularly reflecting surface 130 assumes the orientation shown at 130' and, as a consequence, is introduced in operative position within the exposure chamber. Further, exposure plane 60 is uncovered to assume a position at the terminus of an altered optical path passing from lens system 14 and specular surface 130.

Operator unit 84 is held in the exposure mode orientation shown at 84' as a result of the bias exerted by spring 100. To return it to its focusing and viewing mode orientation, motor 98 is energized to cause the rotation of such drive train gears as at 92 and 94 which, in turn, cause the pivoting of the unit to its alternate position in engagement with solenoid latch 110. Additionally, a deenergization of solenoid 128 will permit blade 122 of shutter assembly 120 to return to a position unblocking the passage of light through viewing assembly 50.

A more detailed description of an operator unit as at 84 and shutter assembly as at 120 is provided in a copending application for U.S. Patent entitled "Reflex Camera," Ser. No. 28,567, by Edwin H. Land, filed Apr. 15, 1970, and assigned in common herewith.

From the foregoing it will be apparent that automatic operation of the camera 10 requires a shutter and aperture control which must accommodate to the somewhat involved mechanical logic involved in converting back and forth between a viewing or focusing mode and an exposure mode of operation. For instance, at the commencement of an exposure cycle, the shutter of the camera must be opened to provide the widest possible aperture and the operator unit 10 must be in its downward position blocking the passage of light to exposure plane 60. As shutter release button 34 is depressed, the shutter must be closed to block the passage of light along optical path 22 while the operator unit 84 rises under the force of spring 100 to its exposure mode orientation at 84'. The shutter must then again open to expose an uppermost film unit as at 62. This exposure is preferably carried out under predetermined program relating optimum exposure interval and aperture values with scene light level. Following an exposure interval, the shutter must be held in its light-blocking or closed position while the operator unit 84 is driven to its downward position blocking the passage of light into the exposure plane 60. When the operator unit 84 is in this light-blocking focusing mode position the shutter must again be opened and establish maximum aperture. Additionally, throughout this sequence of events, the viewing arrangement as at 50 must be selectively blocked and unblocked by shutter 120 to preserve the lighttight integrity of the exposure chamber.

While performing under the logic criteria outlined above, any shutter or exposure control mechanism should be of a noncomplex mechanical design suited for high-volume production techniques. The exposure control mechanism of the present invention meets such criteria.

Referring to FIGS. 2 and 3, the exposure mechanism is illustrated in closer detail. In its preferred embodiment, the mechanism is formed having two cooperatively moving shutter blades 30 and 32 which ride transversely within supporting tracks (not shown) formed within base pate 20. Each of the blades 30 and 32 is formed having a selectively shaped aperture opening, respectively depicted at 140 and 142. Depending upon the position of blades 30 and 32, aperture openings 140 and 142 symmetrically overlap over the exposure aperture 144 of the camera 10 to define selectively varying aperture sizes. Each of the blades 30 and 32 is additionally configured having selectively configured and corresponding photocell sweep openings shown respectively at 146 and 148. Openings 146 and 148 are configured in correspondence with the shapes respectively of aperture openings 140 and 142. The openings 146 and 148 move with mutual symmetry over a small aperture 150 providing for passage of light from the scene being photographed to a photosensing element or elements of a light-sensitive control circuit.

Blades 30 and 32 define a progression of apertures over opening 144 as a result of their connection with a "walking beam" as shown at 152. Walking beam or actuator 152 is rotatably mounted upon a stud 154 extending from base plate 20. An "E" ring 156 secures the beam 152 upon stud 154. Elongate slots as at 158 and 160 are formed in the outward tip portions of beam 152 for the purpose of providing connection with pins 162 and 164 extending respectively from blades 30 and 32. Thus interconnected, the blades 30 and 32 will move simultaneously and in correspondence with each other to define a symmetrically configured and variable-aperture opening over the camera aperture 144 as well as over the photocell aperture 150. Elongate slots 158 and 160 serve the function of accommodating the horizontally restricted movement of blades 30 and 32 along a cord through the locus of rotation of the tips of beam 152. Beam 152 is biased to urge blades 30 and 32 into positions defining their largest openings over aperture 144 by a helical spring 166. The movable end of spring 166 is attached to beam 152 at an opening 168 while its stationary end is affixed to a tab 170 extending from the baseplate 20. With this connection to spring 166, the exposure mechanism is biased into a "normally open" orientation.

Baseplate 20 also supports a solenoid 172 in a position just above spring 166. Solenoid 172 is of conventional design, having an internally disposed cylindrical plunger unit 174 which retracts inwardly into the body of the solenoid upon energization thereof. Plunger 174 is coupled to beam 152 through a dual pin linkage 176.

In its normal or relaxed condition, the exposure mechanism assumes the configuration of FIG. 2 wherein blades 30 and 32 define a maximum opening over aperture 144 as well as over photocell aperture 150. In this condition, solenoid 172 is not energized and walking beam 152 holds the blades 30 and 32 in the position shown by virtue of the rotational bias exerted by helical spring 166. Energization of solenoid 172 will cause plunger 174 to rapidly withdraw into the body of solenoid 172 and, as a consequence, rotate walking beam 152 into the orientation illustrated in FIG. 3. In this orientation, aperture opening 144 of the taking lens optical path is completely closed. A subsequent deenergization of solenoid 172 releases plunger 174 and allows walking beam 152 to rotate under the bias exerted by helical spring 166. This rotation permits openings 140 and 142 of respective shutter blades 30 and 32 to define progressively enlarging apertures as they move toward the terminal position shown in FIG. 2. Simultaneously, openings 146 and 148 define a corresponding progressively enlarging aperture over the photocell opening at 150. When detection circuitry associated with the photocell located at opening 150 develops an appropriate exposure-terminating signal, solenoid 172 will again be energized to retract plunger 174. A retraction of plunger 174 causes shutter blades 30 and 32 to reassume the closed positions shown in FIG. 3. Following an interval required for a camera to reassume its viewing and focusing mode orientation, the solenoid 172 is deenergized to permit blades 30 and 32 to assume the maximum aperture position of FIG. 2.

Because of the slight inertia and mechanical friction necessarily present in the operation of shutter blades 30 and 32 and their associated drive system, the time interval required for their opening from the fully closed orientation of FIG. 3 to the fully opened orientation of FIG. 2 may correspond with the longest practical exposure interval for hand-supporting a camera, i.e., about 25 milliseconds. During this interval, blades 30 and 32 will define progressively enlarging aperture until they simultaneously reach their terminal positions to define an aperture opening of maximum diameter. Depending upon the level of scene brightness, this progressive aperture enlargement will be interrupted as the shutter is closed by the energization of solenoid 172. A desirable programming of aperture with exposure interval results from such an operation.

Figure 4:
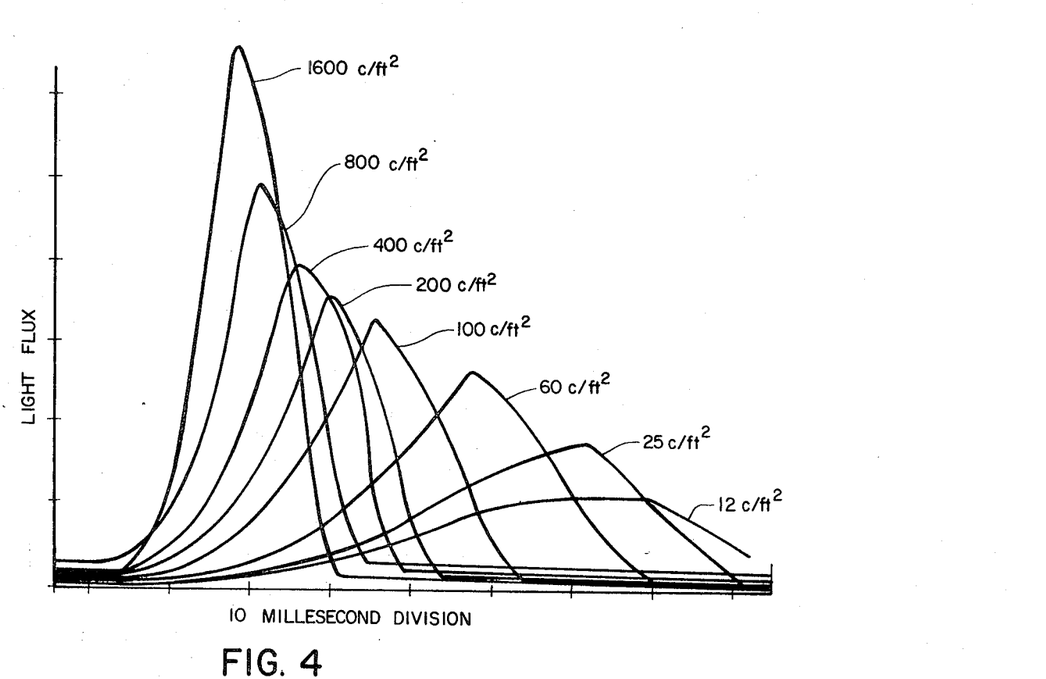
FIG. 4 is a representation of traces from an oscilloscope illustrating the exposure performance of the exposure control system of the invention.

Referring to FIG. 4, a series of curves representing an analysis of the operation of an exposure control system according to the invention is revealed. The instantaneous amplitudes of the curves represent light flux passing through the shutter mechanism of the invention during an interval of exposure. Each curve represents an oscillotrace for a predetermined scene brightness level as appropriately labeled. In establishing the curves, a light-sensing network was utilized in conjunction with an aperture sweep system as described earlier in connection with opening 150 and apertures 146 and 148 to control shutter-closing solenoid energization.

It may be noted from the curves that while the area under each of the traces represents the integrated value of light flux passing through aperture opening 144 during an exposure, at high bright levels, for instance 1,600 c./ft.$^2$, the interval of exposure is very short and, as a consequence, the effective aperture opening will be at a relatively high "$f$" number. These desirable selections of fastest available speed with aperture of smallest practical diameter are retained to the extent possible with diminishing levels of light. Consequently, the earlier discussed desired balance of aperture selection with exposure interval is optimized within the resultant exposure program. Of particular importance, however, this programming of exposure control is achieved with relative simplicity while providing for shutter operation within the logic requirements of a single-lens reflex camera. In this regard, the following sequence of events are accommodated for during an exposure cycle by the solenoid actuated control mechanism of the invention.

1. The shutter is in a normally open state establishing maximum aperture diameter under a deenergized condition. In this condition, exposure plane 60 is blocked by operator unit 84 and viewing arrangement 50 is open. Optimum viewing and focusing is available by virtue of the maximum aperture diameter established by the shutter.

2. An exposure cycle is commenced with the depression of shutter release button 34. Through appropriate circuitry, solenoid 72 is energized to cause the shutter to close. When the shutter is closed operator unit 84 is released for rotation into its exposure mode orientation at 84' and the exposure plane 60 is opened to the optical path of the taking lens 14. Additionally during this conversion, the viewing arrangement 50 is blocked by shutter 120.

3. To commence an exposure, solenoid 172 is deenergized to release the blades 30 and 32 to open over a select interval in accordance with the earlier described predetermined exposure program.

4. Exposure interval is terminated with the reenergization of solenoid 172 and consequent closure of shutter blades 30 and 32. Blades 30 and 32 are held closed by a continued energization of solenoid 172.

5. Operator unit 84 is caused to reassume its orientation blocking exposure plane 60 as a result of the energization of a motor as at 98.

6. As operator unit 84 covers exposure plane 60, viewing arrangement 50 opens with a deenergization of the shutter mechanism at 120 and solenoid 172 is deenergized to permit the shutter blades 30 and 32 to move under the bias of spring 166 to define a maximum aperture opening. The components of camera 10 have now reassumed a focusing and viewing mode orientation.

An electronic control system for use with the exposure mechanism and camera heretofore described is illustrated in connection with the schematic diagram of FIG. 5. The mechanism of the invention does not require complex control circuits to provide adequate operation. For instance, simple switching actuated by movement of the operator unit 84 can provide many of the functions required in converting between focusing and exposure modes. A light-sensing and exposure interval timing circuit may assume a variety of configurations, one such arrangement being disclosed in U.S. Pat. No.

3,362,309 entitled "Exposure Control Apparatus" by E. P. Cooper, Jr., et al.

Figure 5:
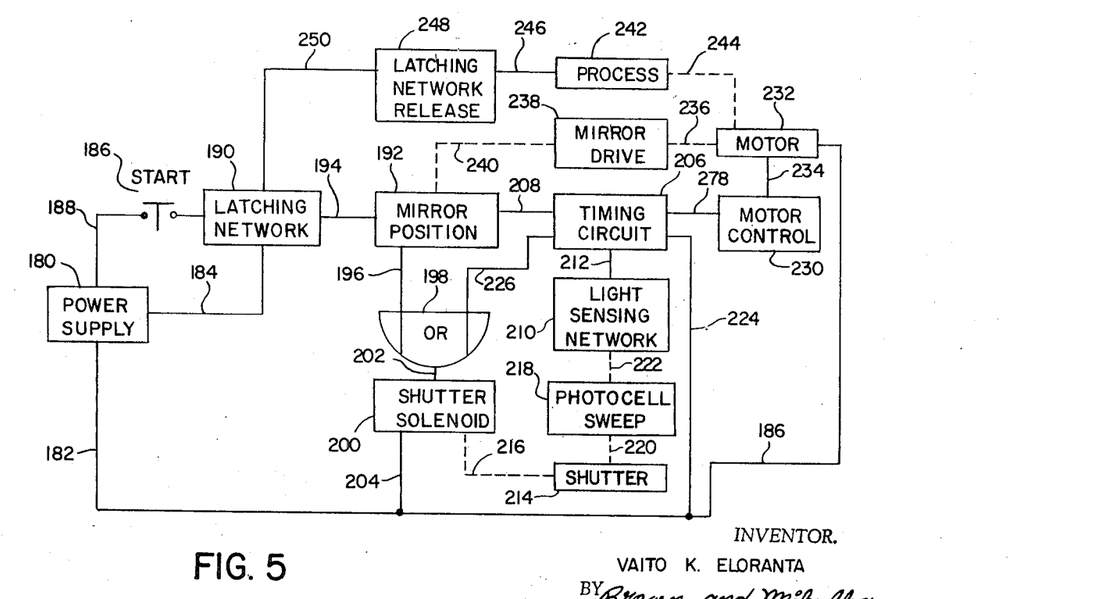
FIG. 5 is a schematic diagram showing the functional components and circuit interrelationships of the control system of the invention.

Looking to FIG. 5, power is supplied to the circuit from a battery or the like as indicated at 180. From power supply 180 power leads extend along lines 182 and 184. The system is energized from power supply 180 upon the momentary depression of a start button indicated at 186 in line 188. Start button 186 will be recognized as corresponding to shutter release button 34 in FIG. 1. A momentary depression of button 186 energizes a latching network 190 which causes continual power to be supplied to the circuit until such time as an unlatching signal is received. Accordingly, upon the actuation of network 190, a mirror position (operator unit) control arrangement 192 is activated from along line 194. Such activation supplies an actuating signal along line 196 to an OR-gate 198. OR-gate 198 conducts this input to cause the energization of a shutter solenoid 200 from along line 202. Shutter solenoid 200 will be recognized as corresponding to solenoid 172 described earlier in connection with FIGS. 2 and 3. Solenoid 200 is interconnected with power supply lead 182 from along line 204. With the energization of solenoid 200, the shutter assumes a light-blocking orientation such as illustrated in connection with FIG. 3.

While the shutter solenoid 200 is held in an energized status to retain the shutter in a light-blocking orientation, the mirror position function 192 will cause energization of solenoid 110 to release operator unit 84 for movement into its exposure mode orientation disclosed earlier in connection with FIG. 1 at 84'. Additionally, solenoid 128 is energized to cause the closure of auxiliary shutter 120 at viewing arrangement 50. When operator unit 84 reaches its exposure mode orientation at 84' a switch or the like, for instance, as may be located at 96, is tripped to cause mirror position function 192 to actuate a timing circuit 206 from along line 208. This actuation, in turn, causes the actuation of a light-sensing network as at 210 from along line 212 accompanied by the deenergization of shutter solenoid 200 from mirror position logic 192.

The shutter blades as disclosed at 30 and 32 now open in accordance with an exposure program logic, while aperture opening 146 and 148 defines simultaneous corresponding aperture openings across a photocell located behind opening 150. This mechanical arrangement is shown schematically in FIG. 5 as a shutter 214 mechanically linked to shutter solenoid function 200 along dashed line 216 and a photocell sweep function 218 mechanically linked to shutter 214 along dashed line 220 and mechanically related to the light-sensing network 210 from along dashed line 222. The photocell sweep function 218 mechanically inserts instantaneous aperture size or position information into the light-sensing network 210.

Circuit input to timing circuit 206 is completed from power lead 182 through a line 224. When light-sensing network 210 evolves an electrical value representing proper exposure, timing circuit 206 is appropriately actuated from along line 212 to cause the reenergization of shutter solenoid 200 from along a line as at 226. Note that line 226 is coupled into OR-gate 198. Timing circuit 206 retains shutter solenoid 200 in an energized state through OR-gate 198 while simultaneously providing a signal along line 228 to a motor control circuit indicated at 230. Motor control circuit 230 functions to switch "on" a motor 232 from along line 254. Motor 232 will be recognized as corresponding to that shown and described at 98 in FIG. 1.

With the energization of the motor function 232, the camera will be caused to cock or reassume a focusing mode orientation. This accomplished in FIG. 1 by the driving of operator unit 84 into latching engagement with the plunger 114 of the now deenergized solenoid 110. The mechanical linkage between motor 232 and the mirror carrying operator unit 84 is indicated in FIG. 5 by a dashed line 236 coupling a mirror drive 238. Information as to the proper positioning of mirror 238, as by switching or the like, is indicated by dashed line 240 which couples mirror drive 238 with mirror position function 192.

Motor 232 may also perform a film-processing function as indicated schematically at 242. Mechanical coupling between the processing function, as partially shown to include rolls 36 and 38 in FIG. 1, is indicated in FIG. 5 by dashed line 244. While not shown in FIG. 1, this linkage may be effected by belt drive or the like between motor 98 and drive mechanism components as shown at 40. Upon the completion of a last requisite mechanical function, any convenient detecting arrangement, for instance a switch associated with the drive system of rolls 36 and 38 may be used to deenergize latching network 190. This function is indicated by a line 246 coupling process function 242 with a latching network release 248, the latter being coupled with latching network 190 from along line 250. As latching network 190 is deenergized, all power to the circuit is interrupted and, as a consequence, all solenoids are deenergized to permit the camera 10 to assume its focusing viewing mode orientation.

From the foregoing it may be noted that a somewhat involved reflex logic is provided within the camera 10 while the components forming its exposure control system are of relatively simple construction and operation. This desirable simplicity is achieved through such features as the use of a solenoid drive and, in particular, the use of such an electromagnetic drive system to cause the shutter mechanism to assume a closed status.

Since certain changes may be made in the above photographic apparatus and system without departing from the scope of the invention herein involved, it is intended that all matter contained in the above description or shown in the accompanying drawings shall be interpreted as illustrative and not in a limiting sense.

What is claimed is:

1. An exposure control system for photographic apparatus comprising:
   means defining an exposure aperture;
   shutter blade means movable between closed and opened terminal positions for respectively blocking and unblocking the passage of scene light through said aperture;
   means for biasing said shutter blade means to move toward said opened terminal position;
   electromagnetic drive means selectively energizable to cause said shutter blade means to assume said closed terminal position, deenergizable to permit movement of said shutter blade means by said biasing means from said closed toward said opened terminal position to initiate an exposure through said aperture and subsequently energizable to move said shutter blade means into said closed terminal position to terminate said exposure; and
   control means for causing said selective energization of said electromagnetic drive means.

2. The exposure control system of claim 1 in which said shutter blade means is configured and arranged to establish a progressive variation of effective apertures when moved between said closed and opened terminal positions.

3. The exposure control system of claim 2 in which said means for biasing said shutter blade means is selected to move said shutter blade means between said terminal positions at a predetermined rate.

4. The exposure control system of claim 3 in which said control means includes light-sensitive circuit means responsive to the said progressive variation of effective apertures and to scene light for regulating said electromagnetic drive means selective energization.

5. The exposure control system of claim 1 in which said electromagnetic drive means includes a solenoid.

6. The exposure control system of claim 5 in which said shutter blade means includes two shutter blades simultaneously movable in correspondence to define a progressive variation of effective apertures over said exposure aperture.

7. The exposure control system of claim 6 in which said shutter blade means further includes actuator means pivotally coupled with each said shutter blade and rotatable to effect said simultaneous and corresponding movement.

8. The exposure control system of claim 7 in which said solenoid has a plunger element movable in response to the energization thereof and coupled with said actuator means.

9. An exposure control system for photographic apparatus comprising:
   means defining an optical path for transmitting light from a scene to be photographed onto a photographic material;
   shutter means having a driven mode effective to block the passage of light along said optical path and a relaxation mode effective to progressively unblock said optical path to derive a predetermined variation of effective apertures during the progression of an interval of exposure;
   drive means energizable to cause said shutter means to assume said driven mode; and
   circuit means responsive to said aperture variation and to the level of said scene light for controlling the said energization of said drive means.

10. The exposure control system of claim 9 in which said shutter means is operative to establish in enlarging variation of aperture opening over said optical path when in said relaxation mode.

11. The exposure control system of claim 9 in which said drive means includes a solenoid.

12. The exposure control system of claim 9 in which said drive means is deenergizable by said circuit means following said energization for causing said shutter means to assume said relaxation mode.

13. The exposure control system of claim 9 including means for biasing said shutter means to progressively unblock said optical path.

14. An exposure control system for photographic apparatus comprising:
   mean defining an optical path for exposing a photosensitive material to scene light;
   shutter means movable between closed and opened terminal positions for respectively blocking and unblocking the passage of light within said optical path, said element being configured to define a time-dependent progressive variation of exposure apertures when moved between said terminal positions;
   means for biasing said shutter means to move toward said opened terminal position;
   electromagnetic drive means energizable to cause said shutter means to assume said closed position, deenergizable to permit said movement under said bias from said closed terminal position toward said opened terminal position to initiate an exposure and subsequently energizable to move said shutter means into said closed terminal position to terminate said exposure; and
   circuit means responsive to said progressive variation of exposure apertures and to the level of said scene light in accordance with the sensitometric properties of said photosensitive material for controlling the said energization of said electromagnetic drive means to cause said exposure termination.

15. The exposure control system of claim 14 in which said shutter means progressive variation of exposure apertures is selected to establish a maximum aperture opening when said shutter means is in said opened terminal position.

16. The exposure control system of claim 14 in which said means for biasing said shutter means is operative to provide a predetermined rate for said movement between said shutter means closed and opened terminal positions.

17. The exposure control system of claim 14 in which said electromagnetic drive means includes a solenoid.

18. The exposure control system of claim 17 in which said shutter means includes two shutter blades movable in correspondence to define said progressive variation of exposure apertures.

19. An exposure control system for a single-lens reflex camera having a viewing mode permitting the viewing of the image of a scene before and after an exposure, and an exposure mode for exposing a photosensitive material, comprising:
   means defining an optical path for exposing said photosensitive material at an exposure plane to light from a scene to be photographed;
   shutter means movable toward an open terminal position to progressively vary the value of a said exposure and movable toward a closed position to block the passage of light along said optical path;
   means for biasing said shutter blade means to move toward said open terminal position;
   electromagnetic drive means selectively energizable to cause said shutter means to assume said closed position, deenergizable to permit said movement of said shutter means by said biasing means from said closed toward said open terminal position to initiate said exposure, and subsequently energizable to move said shutter means to said closed position to terminate said exposure; and
   reflex operator means for blocking the exposure of said photosensitive material in the vicinity of said exposure plane following said subsequent energization.

20. The exposure control system of claim 19 in which said shutter means is configured and arranged for defining a time-dependent progressive variation of exposure apertures when moved between said open and closed positions.

21. The exposure control system of claim 19 in which said electromagnetic drive means is configured for permitting said shutter means to assume said open terminal position when said camera is in said viewing mode.

22. The exposure control system of claim 21 in which said reflex operator means is operative to unblock the passage of said scene light to said exposure plane when said camera is converted to said exposure mode.

23. The exposure control system of claim 22 in which said electromagnetic drive means is operative to cause said shutter means to move to said closed position when said camera is altered from said viewing mode into said exposure mode.

24. The exposure control system of claim 19 in which said electromagnetic drive means includes a solenoid.

25. The exposure control system of claim 19 in which said electromagnetic drive means includes circuit means responsive to said exposure value variation for controlling the said energizations.

26. An electrically controllable exposure control system for photographic apparatus comprising:
   means defining an exposure aperture;
   normally open shutter means movable between a normally open position unblocking the passage of light through said aperture and a closed position blocking the passage of light through said aperture;
   nonelectrical means for biasing said shutter means toward said normally open position; and
   electrical means energizable to drive said shutter means into said closed position against the bias of said nonelectrical means, whereby upon deenergization of said electrical means said shutter means reassumes its normally open condition.

27. The exposure control system of claim 26 in which said electrical means includes a solenoid.

28. The exposure control system of claim 26 in which said electrical means comprises:
   solenoid means for driving said shutter means into said closed position when energized; and
   circuit means for controlling the said energization of said solenoid means.

29. The exposure control system of claim 26 in which said manually open shutter means is configured and arranged to define a progressive variation of effective aperture openings over said exposure apertures when moved from said closed position toward said open position.

30. The exposure control system of claim 26 in which:
   said normally open shutter means is configured and arranged to define a progressively variation of effective aperture openings over said exposure aperture when moved from said closed position toward said open position; and said electrical means includes solenoid means for driving said shutter means into said closed position when energized, and circuit means responsive to said progressive variation of effective aperture openings and to light from a scene being photographed for controlling the said energization of said solenoid means.

31. The exposure control system of claim 26 in which:

said normally open shutter means is configured and arranged to define a progressive variation of effective apertures across said exposure aperture when moved from said closed position toward said open position;

said electrical means including a solenoid coupled with said normally open shutter means; and said nonelectrical means includes a spring coupled with said shutter means.

32. The exposure control system of claim 31 in which said electrical means further includes circuit means responsive to said progressive variation of effective apertures and to light from a scene being photographed for controllably energizing said solenoid.

33. A single-lens reflex camera having a viewing mode permitting the viewing of the image of a scene before and after an exposure, and an exposure mode for exposing a photosensitive material to light from said scene comprising:

means defining an optical path for imaging light from said scene at a viewing plane when said camera is in said viewing mode and for exposing said photosensitive material at an exposure plane when said camera is in said exposure mode;

shutter means movable about said optical path toward an open terminal position to define a time dependent progressive variation of exposure apertures and movable toward a closed position to block the passage of light along said optical path;

means for normally biasing said shutter means to move toward said open terminal position;

electromagnetic drive means energizable to cause said shutter means to assume said closed position and deenergizable to permit said movement of said shutter means by said biasing means from said closed toward said open terminal position;

operator means actuable to block the exposure of said photosensitive material in the vicinity of said exposure plane when said camera is in said viewing mode and to unblock said exposure plane when said camera is in said exposure mode; and control means for causing said camera to normally assume said viewing mode and actuable to cause said camera to assume said exposure mode by selectively energizing and deenergizing said electromagnetic drive means and actuating said operator means in correspondence therewith.

34. The single-lens reflex camera of claim 33 in which said control means is operative during said camera exposure mode to initially energize said electromagnetic drive means and actuate said operator means to unblock said exposure plane, thence to deenergize and selectively energize said electromagnetic drive means for exposing said photosensitive material and, subsequently, to actuate said operator means to block the said exposure plane and deenergize said electromagnetic drive means.

35. The single-lens reflex camera of claim 34 in which said electromagnetic drive means includes a solenoid coupled in driving relationship with said shutter means.

36. The single-lens reflex camera of claim 35 in which said shutter means includes two shutter blades movable in mutual correspondence to define said progressive variation of exposure apertures.

37. The single-lens reflex camera of claim 36 in which said operator means is biased for movement into a position blocking said exposure plane.

* * * * *